US011428523B2

(12) United States Patent
Bonetti

(10) Patent No.: US 11,428,523 B2
(45) Date of Patent: Aug. 30, 2022

(54) THREE-DIMENSIONAL OPTICAL MEASUREMENT METHOD FOR ROPES OR CABLES AND SYSTEM

(71) Applicant: BRIDON INTERNATIONAL LIMITED, Doncaster (GB)

(72) Inventor: Cristiano Bonetti, Rovereto (IT)

(73) Assignee: BRIDON INTERNATIONAL LIMITED, Doncaster (GB)

( * ) Notice: Subject to any disclaimer, the term of this patent is extended or adjusted under 35 U.S.C. 154(b) by 0 days.

(21) Appl. No.: 17/277,659

(22) PCT Filed: Sep. 19, 2019

(86) PCT No.: PCT/IB2019/057925
§ 371 (c)(1),
(2) Date: Mar. 18, 2021

(87) PCT Pub. No.: WO2020/058907
PCT Pub. Date: Mar. 26, 2020

(65) Prior Publication Data
US 2022/0026197 A1  Jan. 27, 2022

(30) Foreign Application Priority Data

Sep. 19, 2018  (IT) .................. 102018000008732

(51) Int. Cl.
*G01B 11/24* (2006.01)
*B66B 7/12* (2006.01)
(Continued)

(52) U.S. Cl.
CPC ........ *G01B 11/2408* (2013.01); *B66B 7/1238* (2013.01); *G01B 11/08* (2013.01);
(Continued)

(58) Field of Classification Search
CPC ... G01B 11/2408; G01B 11/08; G01B 11/245; B66B 7/1238; D07B 7/02;
(Continued)

(56) References Cited

U.S. PATENT DOCUMENTS 3,783,294 A * 1/1974 Koper .................. G01C 11/00
250/558
4,887,155 A  12/1989 Massen
(Continued)

FOREIGN PATENT DOCUMENTS

CN  105890530 A  8/2016
EP  0271728 A2  6/1988
(Continued)

OTHER PUBLICATIONS

International Search Report and Written Opinion for International Patent Application No. PCT/IB2019/057925, dated Dec. 20, 2019, 14 Pages.
(Continued)

*Primary Examiner* — Michael P LaPage
(74) *Attorney, Agent, or Firm* — Armstrong Teasdale LLP

(57) ABSTRACT

A three-dimensional measurement method of geometric parameters of a rope or a cable provides for obtaining a three-dimensional representation of a plurality of 3D contour points of the rope or cable and calculating the geometric parameters thereof, such as diameter, roundness and axis. A calibrated three-dimensional optical measurement system for measuring geometric parameters includes a plurality of digital image acquisition devices and a digital image processing device configured to perform the steps of the three-dimensional measurement method.

18 Claims, 13 Drawing Sheets

(51) Int. Cl.
    *G01B 11/08*     (2006.01)
    *G01B 11/245*    (2006.01)
    *D07B 7/02*      (2006.01)

(52) U.S. Cl.
    CPC .............. *G01B 11/245* (2013.01); *D07B 7/02* (2013.01); *D07B 2301/5572* (2013.01)

(58) Field of Classification Search
    CPC ........ D07B 2301/5572; D07B 2301/45; D07B 2301/5581
    See application file for complete search history.

(56) References Cited

U.S. PATENT DOCUMENTS

| | | | |
|---|---|---|---|
| 2011/0268313 A1 | 11/2011 | Winter et al. | |
| 2012/0259204 A1 | 10/2012 | Carrat et al. | |
| 2015/0300810 A1* | 10/2015 | Fojtik | G01B 11/105 356/635 |
| 2017/0054965 A1* | 2/2017 | Raab | G06T 7/90 |
| 2018/0180733 A1* | 6/2018 | Smits | H04N 13/383 |
| 2019/0253695 A1* | 8/2019 | Festa | H04N 5/232 |
| 2020/0003549 A1* | 1/2020 | Nota | G01B 11/08 |
| 2020/0296249 A1* | 9/2020 | Parian | H04N 1/047 |

FOREIGN PATENT DOCUMENTS

| | | |
|---|---|---|
| WO | 2017140386 A1 | 8/2017 |
| WO | 2018101297 A1 | 6/2018 |

OTHER PUBLICATIONS

Partial English Translation of Italian Search Repod for IT Patent Application No. IT2018000008732, dated May 10, 2019, 7 pages.

International Preliminary Report on Patentability for International Patent Application No. PCT/IB2019/057925, dated Dec. 7, 2020, 27 Pages.

Bonetti et al., "The new frontier of NDE using a combination of MRT, 3D Measurement and Vision System", OIPEEC Conference—La Rochelle, Apr. 2017, pp. 135-154.

* cited by examiner

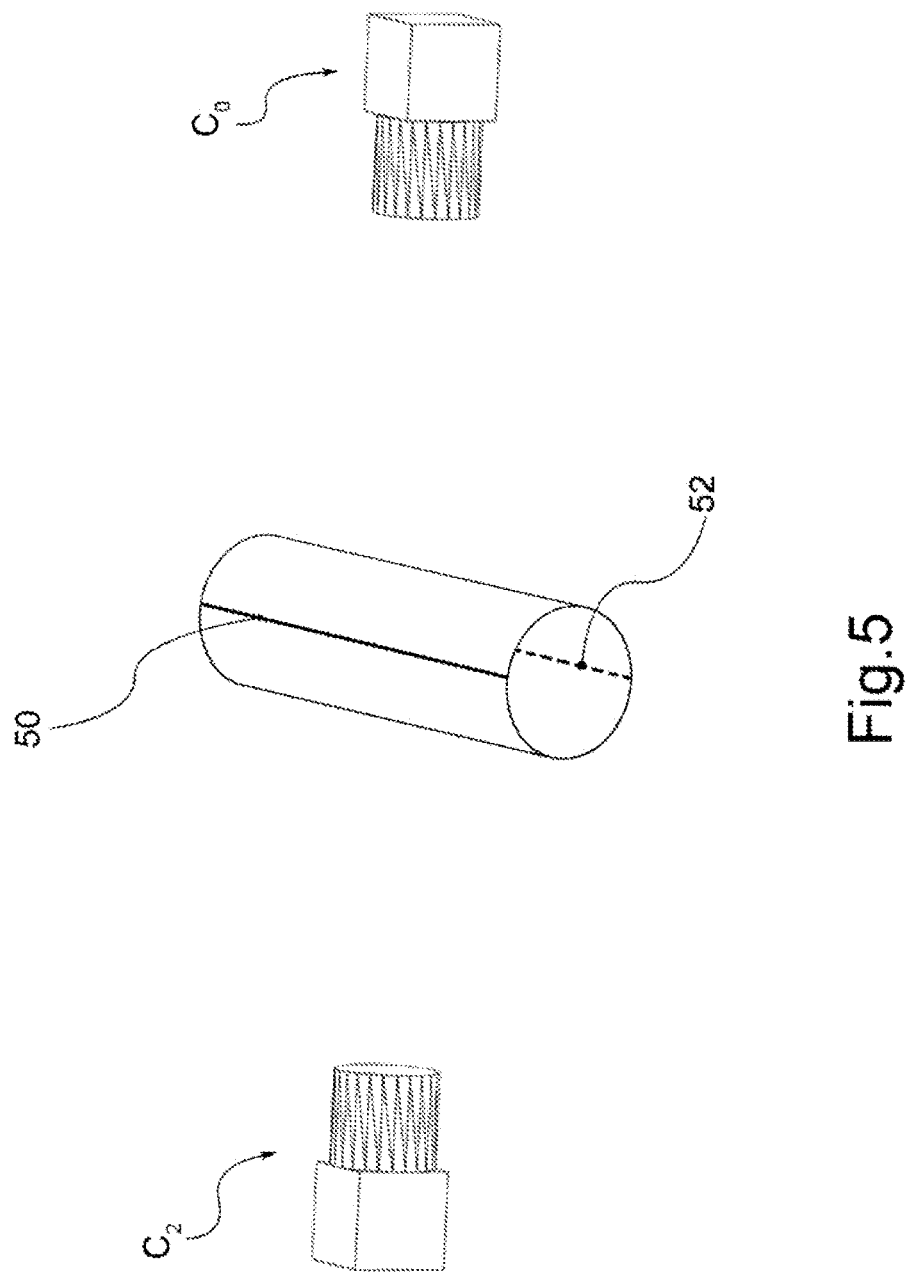

THREE-DIMENSIONAL OPTICAL MEASUREMENT METHOD FOR ROPES OR CABLES AND SYSTEM

CROSS-REFERENCE TO RELATED APPLICATIONS

This application is a National Stage Application of International Patent Application No. PCT/IB2019/057925, having an International Filing Date of Sep. 19, 2019, which claims the benefit of priority to Italian Patent Application No. 102018000008732, filed Sep. 19, 2018, the entire contents of each of which are hereby incorporated by reference herein.

FIELD OF THE INVENTION

The present invention is generally placed within the systems of measurement and inspection of solid objects, stationary or in motion, using non-destructive and contact-less techniques. In particular, the subject-matter of the present invention is a calibrated optical system and a method for the three-dimensional (3D) measurement of a rope or a cable by means of capturing digital images of the outer surface of the rope or cable. Examples of application of this method concern the continuous measurement of ropes or cables, which would otherwise not be possible with contact methods due to the movement of the object measured. For example, such measurements relate to the inspection of ropes or cables of chairlifts and/or cable cars during the operation thereof. Moreover, the present invention concerns the continuous measurement of ropes or cables in a production line, for quality control or periodic inspections in operation, exceeding the limits of the electromagnetic devices of the prior art.

BACKGROUND OF THE INVENTION

Known measurement and inspection techniques in many cases involve the presence of the operator in difficult and/or hazardous environmental conditions, such as measurements in environments contaminated by chemicals or with suspended ropes. Disadvantageously, moreover, in many cases it is also necessary to stop the production or transport systems in order to carry out the measurement.

Techniques are known for measuring geometric parameters of ropes by processing two-dimensional (2D) images of the rope. Inconveniently, these techniques are subject to measurement errors due to the perspective location between the rope and the camera. In addition, techniques are known for measuring geometric parameters of ropes using cameras with linear sensors, but these techniques are not only subject to errors in case of imperfect perpendicularity between the plane passing through the sensor and the axis of the rope; they also suffer from errors due to the vibrations to which the rope is subjected during measurement.

The object of the present invention is to create a method and a system for the three-dimensional measurement of geometric parameters of a rope or a cable, rigid or flexible, that allow the inconveniences mentioned above to be overcome.

SUMMARY OF THE INVENTION

This object is achieved by a method for the three-dimensional measurement of geometric parameters of a rope or a cable and by an optical system calibrated according to the accompanying independent claims; the claims dependent thereon describe variant embodiments.

Preferably, the type of ropes and cables that may be analyzed by the calibrated optical system provides for both rigid and flexible ropes, in any type of material, such as iron, steel, natural or synthetic fibers, carbon fibers and the like. In other words, "rope" may mean any axial-symmetric object with a preferred dimension of extension (length) much greater than the other two dimensions, for example, the preferred dimension of extension has a length more than 100 times the other two dimensions.

Preferably, the rope or cable has an external surface with one or more of the following characteristics:

continuous or at least continuous in sections, e.g. smooth or with grooves on the surface;

solid spiral, e.g., spiral bars;

consisting of one or more helically wound sub-parts, e.g., spiral or stranded cables or ropes.

For example, the rope consists either of a single thread, or of several intertwined threads, which form the so-called strand, or of several intertwined strands, so that the rope is formed by several intertwined threads to form individual strands, the latter in turn intertwined with each other.

The rope or cable may also be made of intertwined fibers.

The calibrated three-dimensional optical measurement system for measuring the geometric parameters of a rope or cable comprises a plurality of digital imaging devices suitable for capturing a multiplicity of digital images of at least one region of the outer surface of the rope or cable.

Preferably, the digital image acquisition devices are cameras with matrix-type image sensors (i.e., that are able to acquire digital images on a matrix of pixels). Moreover, the system provides for a digital image processing device arranged to perform the steps of the method for the measurement of these geometric parameters of the rope or cable which will be detailed in the following paragraphs.

In summary, in an embodiment, the system allows a plurality of points of at least one region of the outer surface of the rope or cable to be reconstructed photogrammetrically in a three-dimensional space from corresponding points on each digital image and then the geometric parameters to be calculated by means of this plurality of three-dimensional points.

Preferably, the geometric parameters measured by the optical system relate to at least one of the following measurements:

Point diameter of the rope or cable or average diameter of the solid of rotation that approximates or circumscribes the rope or cable;

point roundness of the rope or cable or average roundness of the solid of rotation that approximates or circumscribes the rope or cable;

position, orientation and linearity of the axis of the rope or cable or of the solid of rotation that approximates or circumscribes the rope or cable;

length of the rope or cable measured along the axis of the rope or cable or of the solid of rotation that approximates or circumscribes the rope or cable;

the pitch of the rope or cable, i.e., the distance between adjacent coils or helices for samples of which the outer surface is solid spiral or consisting of one or more helically wound sub-parts. For example, the pitch of the rope is calculated between the coils or helices consisting of the strands or wires adjacent to each other that make up the rope.

Moreover, in one embodiment, the digital image capture devices are equipped with optics of which the optical focuses lie on a circumference offset by 90°, with each optic facing the center of the circumference. These digital image capture devices, moreover, are oriented so that the horizontal axes of each optical sensor are substantially perpendicular to the plane containing the circumference and are all oriented in the same sense.

BRIEF DESCRIPTION OF THE DRAWINGS

The features and advantages of the calibrated optical system and the method for measuring the geometric parameters of a rope or cable according to the present invention will be evident from the description below, given by way of non-limiting example, in accordance with the accompanying figures, wherein:

FIG. 5 illustrates a detail of the representative diagram of the optical system calibrated according to an embodiment of the invention wherein the contour lines of the rope common to each field of view of the pair of image capture systems are outlined with thicker lines, wherein each digital device is arranged in diametrically opposed positions along an axis perpendicular to the axis of the rope.

DETAILED DESCRIPTION

Figure 1:
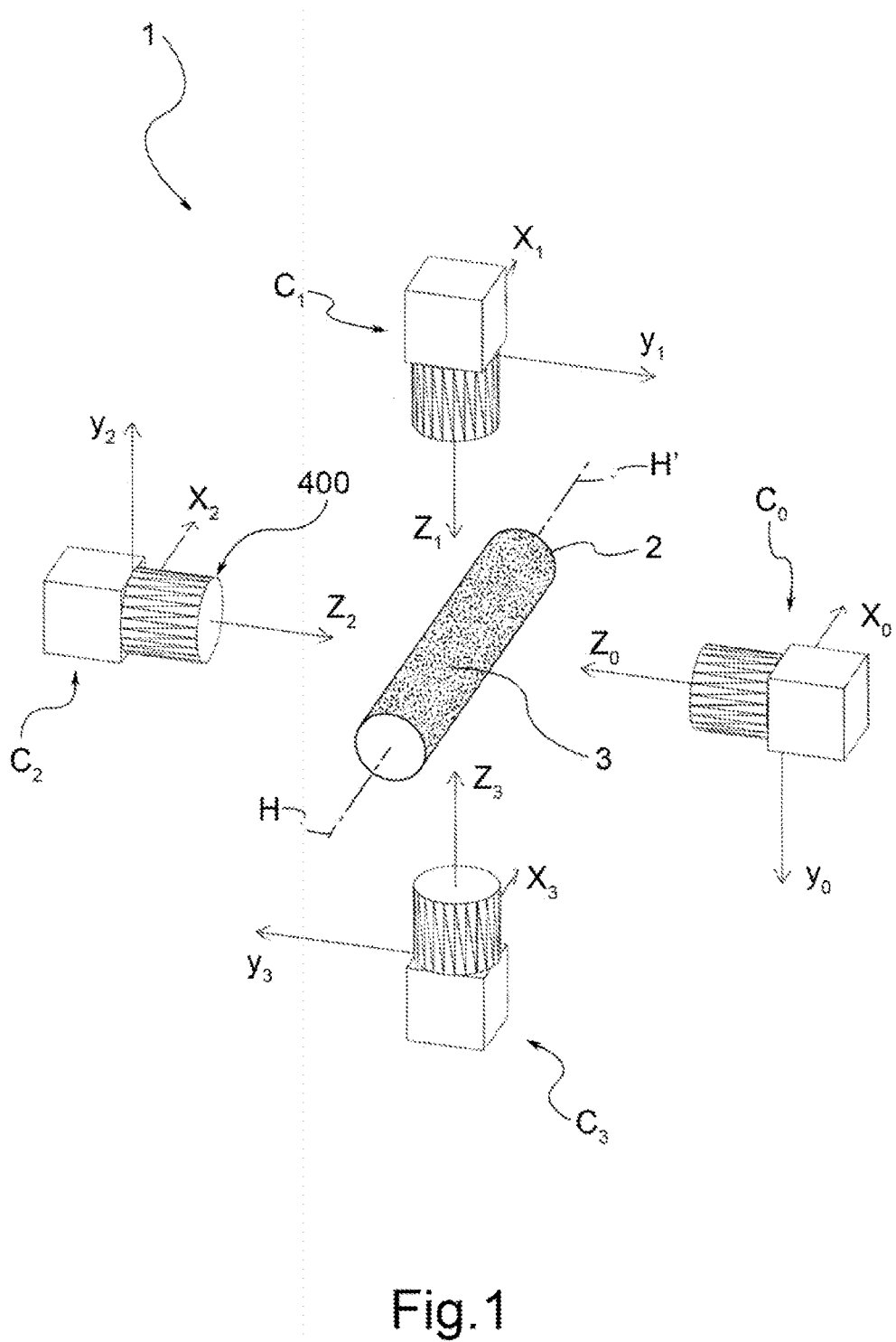
FIG. 1 represents a diagram of the optical system calibrated according to an embodiment of the invention, wherein the digital image capture devices C0 . . . C3 and the rope or cable are visible.
Figure 2:
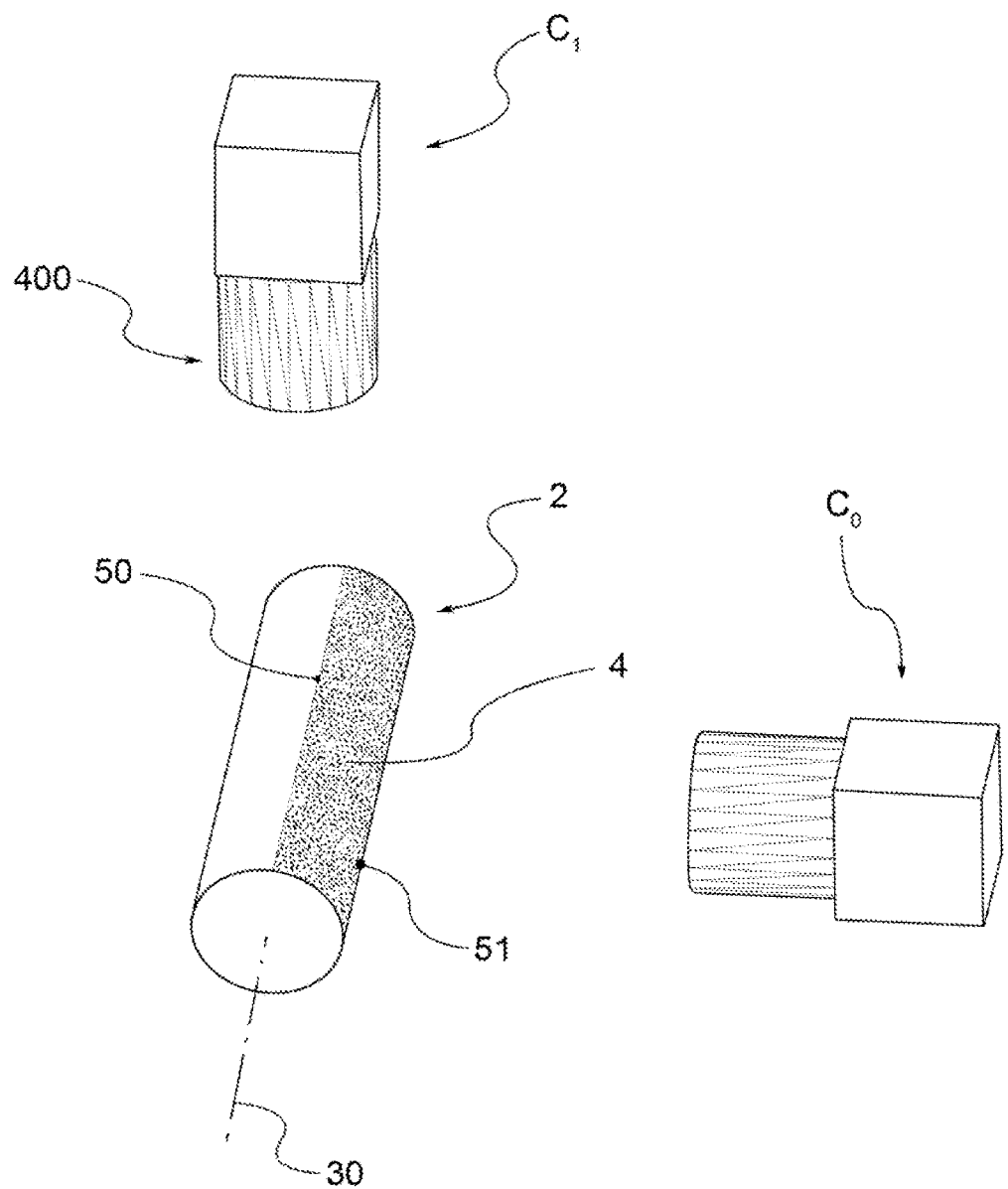
FIG. 2 shows a part of the representative diagram of the optical system calibrated according to an embodiment of the invention.
Figure 3:
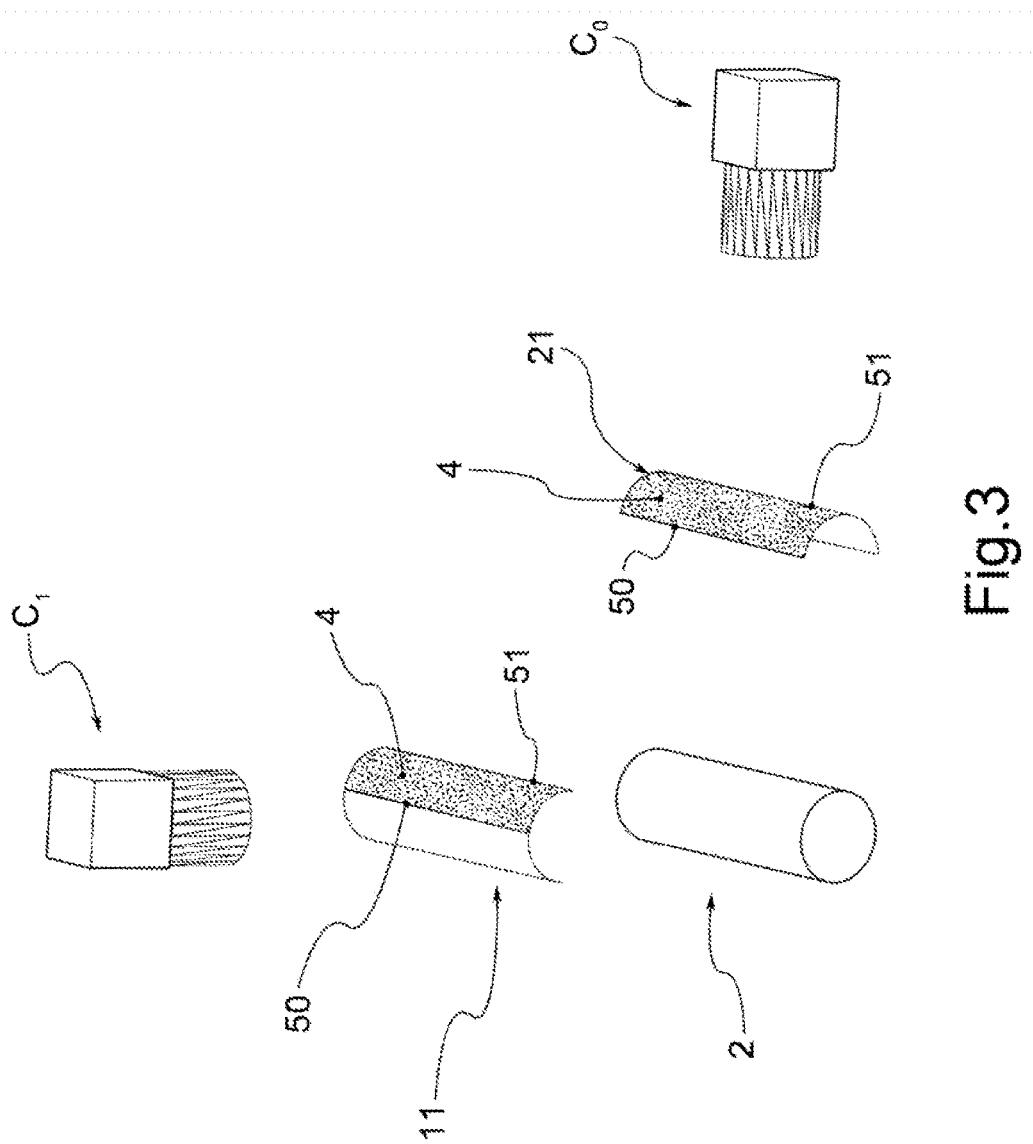
FIG. 3 shows a diagram of the optical system calibrated according to an embodiment of the invention, wherein near each digital imaging device is virtually represented the portion of the rope (or cable) framed and visible by the respective image capture device and wherein the common area visible to both devices is represented by a dotted lattice.
Figure 4:
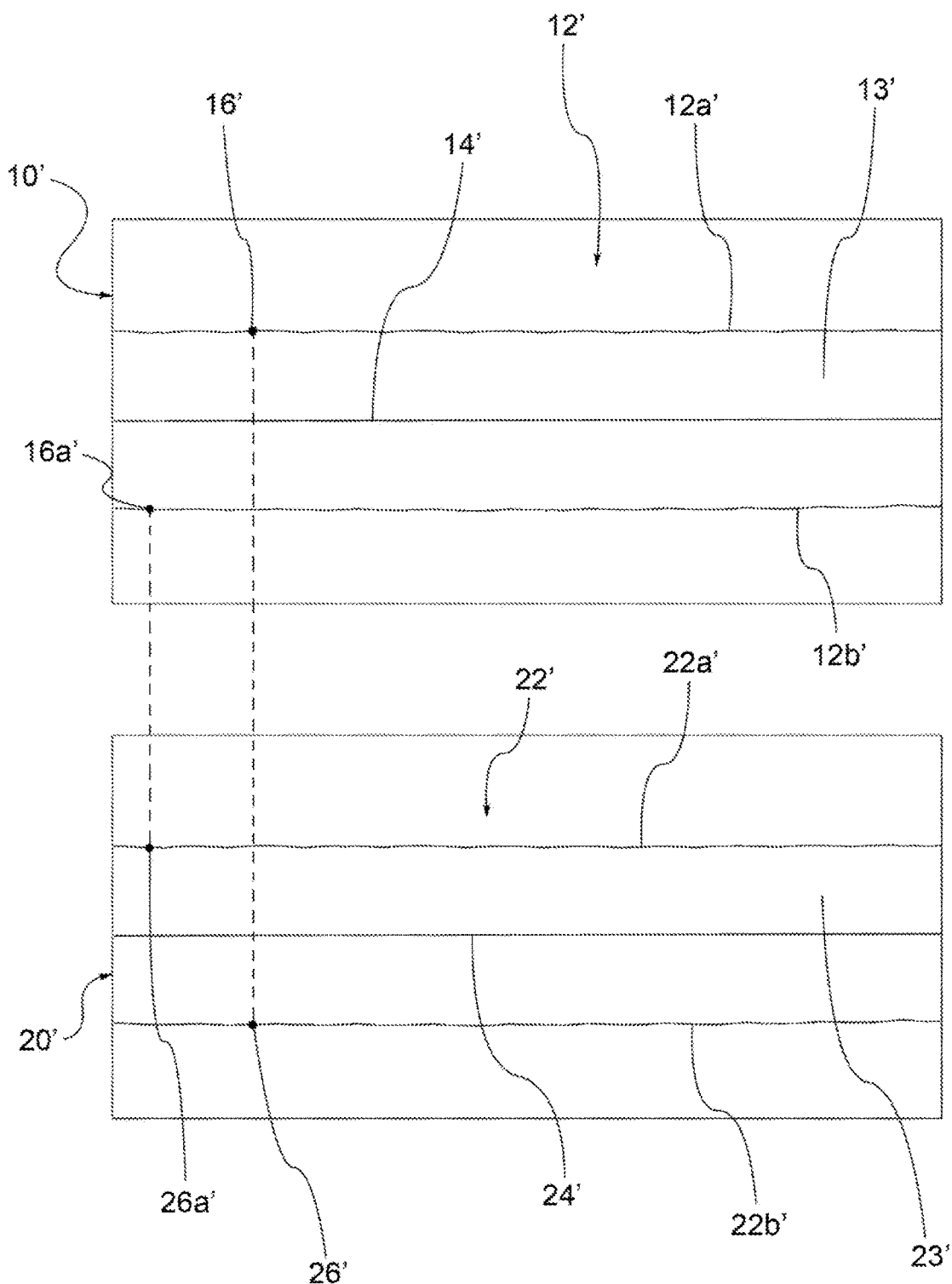
FIG. 4 shows a pair of digital images captured and processed according to a step of an embodiment of the present invention, wherein the pair of images is captured by a pair of image capture devices arranged in diametrically opposed positions, as shown in FIG. 5 below.
Figure 4A:
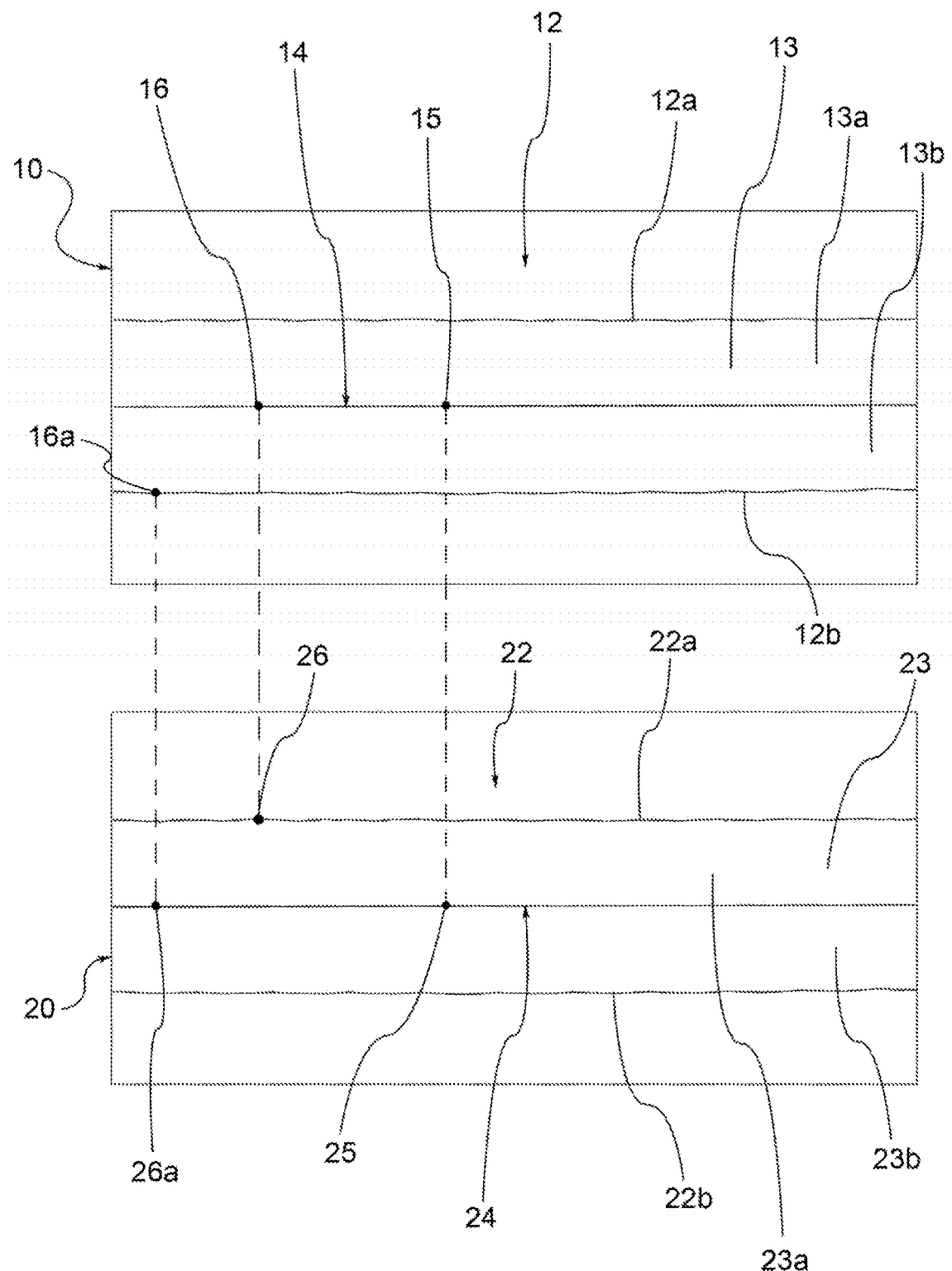
FIG. 4a shows a pair of digital images captured and processed according to a further step of an embodiment of the present invention, wherein the pair of images is captured by two adjacent digital image capture devices, for example arranged along a circumference having a center substantially on the axis of the rope and offset by 90°.
Figure 6:
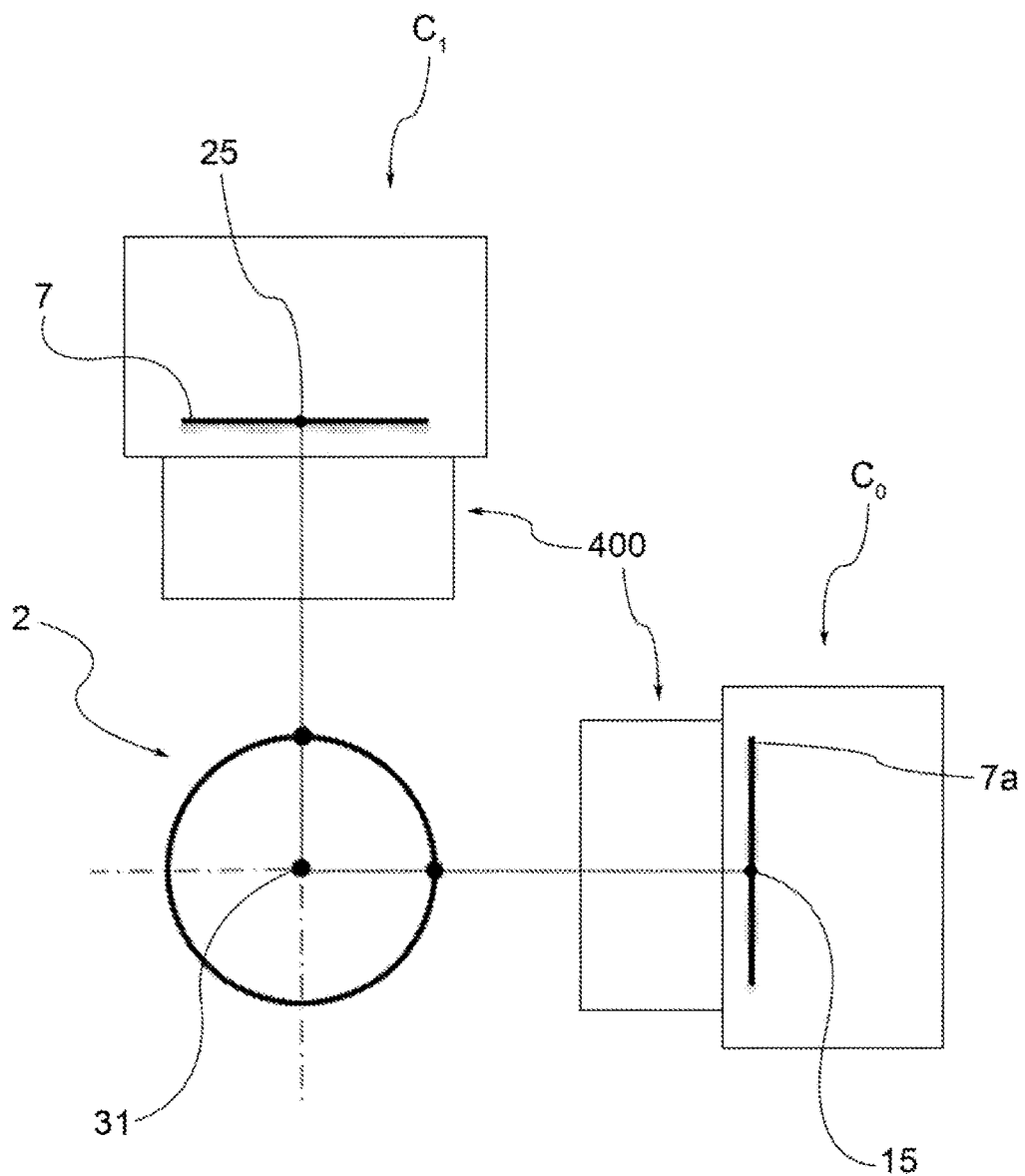
FIG. 6 illustrates a conceptual scheme of the method for the reconstruction of a point on the rope axis according to an embodiment of the present invention, starting from the points on the image planes (i.e., the planes of the sensors suitable to capture the images) of the digital image capture devices.

Preferably, the scales shown on the X, Y, Z axes in FIGS. 7, 8, 9 and 12 are representative of an embodiment of steps of the method and are not to be taken as restrictive.

In one embodiment, in accordance with the accompanying figures, a calibrated optical system consisting of at least one pair of cameras C0, C1, C2, C3, having optics 400, the optical focuses of which lie on a circumference offset by 90° with the optics 400 facing the center of the circumference is indicated collectively at 1. On each camera are identified right-handed Cartesian axis systems Xi, Yi, Zi, for example with i={0,1,2,3}, integral respectively with the i-th camera, with origin in the focus of the optics, having the axes Xi and Yi with direction and sense coinciding with the X and Y axes of each image sensor (7, 7a) of the camera; preferably, these cameras C0, C1, C2, C3, are oriented so that the axes Xi are perpendicular to the plane containing the circumference and all oriented in the same sense, the axes Zi oriented towards the center of the circumference. The three-dimensional space X0 Y0 Z0 of the C0 camera is preferably taken as the absolute three-dimensional reference system.

Preferably the rope or cable is positioned within the system in an appropriate manner, so that it is comprised in the field of vision of each camera and the dimensions of the radius of the circumference on which the cameras are placed, the focal length of the optics, the size of the sensors of the cameras are adjusted so that they are suitable to the length of the sample measured along the axis, the maximum measurable diameter or the resolution to be obtained by the measurement system.

Preferably the system is subjected to calibration, for example as soon as the step of assembling the image capture devices has been completed, in order to obtain the intrinsic and extrinsic parameters of each device necessary for the subsequent steps for the three-dimensional photogrammetric reconstruction of the points of the captured images, thus obtaining an intrinsically calibrated system.

Referring to the well-known definition of epipolar line in epipolar geometry (which describes the relationships and geometric constraints that bind two 2D images of the same 3D scene captured by two cameras), it is known that a point on an image implies a line in the world, and the line in the world projected on another image, captured by a camera placed in a different point of view, represents the epipolar line where the counterpart of the point of the first image lies. The relationships between homologous points, epipolar lines and geometry of the image capture system are described by means of appropriate known algebraic relationships. In order to take advantage of the aforesaid notions of epipolar geometry, for example, in the case wherein the image capture device is a camera, the following are calculated:

the intrinsic (or calibration) matrix;

the dix parameters of the distortion function fi(r)=(1+ di1r+di2r2+di3r3+di4r4+di5r5+di6r6) of the i-th camera where r represents the distance of the point on the digital image at the center of the sensor, wherein these parameters allow the images to be corrected from the effects of the intrinsic distortion of the optics;

the rototranslation matrix between the Cartesian systems of each camera;

the essential matrix;

the fundamental matrix;

rectification matrices;

the projection matrices from planes rectified to the 3D space.

Preferably, downstream of the calibration, the aforesaid parameters and the aforesaid matrices having been calculated, for example, any point belonging to the rope or cable starting from two images captured from two different image capture devices that frame this point of the rope or cable is reconstructed photogrammetrically in a three-dimensional space.

More specifically, the method for the three-dimensional measurement of geometric parameters of a rope or cable 2, for example by means of the calibrated optical system 1 described above, provides for the steps of:

a1) capturing a first digital image 10, 10' of a first region 11 of the outer surface 3 of the rope or cable;

b1) capturing a second digital image 20, 20' of a second region 21 of the outer surface 3 of the rope or cable, said second region 21 being at least partially distinct from said first region 11;

c1) determining a first 12, 12' and a second series of contour lines 22, 22' respectively on said first 10, 10' and said second digital image 20, 20' of said first 11 and said second region 21 of the outer surface 3 of the rope or cable, wherein said first 12, 12' and said second series of contour lines 22, 22' comprise respectively a first plurality of image contour points and a second plurality of image contour points;

d1) searching for a first contour point 16, 16a, 16', 16a' and a second contour point 26, 26a, 26', 26a' belonging respectively to said first plurality of image contour points and said second plurality of image contour points, so that the first contour point 16, 16a, 16', 16a' and the second contour point 26, 26a, 26', 26a' are homologous points or points belonging to the same epipolar line and each representing the image of a surface point 50, 51, 52, said surface point 50, 51, 52 being a point in common with the first 11 and the second region 21 of the outer surface 3 of the rope or cable;

e1) back-projecting photogrammetrically the first 16, 16a, 16', 16a' and the second contour point 26, 26a, 26', 26a' in a three-dimensional space 40, in such a way as to obtain a 3D contour point 60, 61, 62 referring to said three-dimensional space 40;

f1) repeating the steps a1) to e1) a plurality of times until the three-dimensional representation of at least one first plurality of 3D contour points 60' and a second plurality of 3D contour points 61', 62' referring to said three-dimensional space 40 is obtained;

g1) calculating at least one of the following geometric parameters of the rope or cable by means of at least the first plurality of 3D contour points and/or the second plurality of 3D contour points: diameter 80, 81 of the rope or cable, or roundness of the rope or cable, or axis 30 of the rope or cable.

It is clear that the term "roundness" also means an index of the roundness of the rope or cable.

For example, the first series of contour lines 12 are the representation on the digital image of the contour lines of the first region of the outer surface 11 of the rope or cable, seen by a first digital image capture device C1, while the second series of contour lines 22 are the representation on the digital image of the contour lines of the second region of the outer surface 21 of the rope or cable, seen by a second digital image capture device C0.

Preferably, the operations for calculating the axis of the rope or cable provide for the calculation of the length of the axis and the orientation thereof.

Preferably, in addition to the aforesaid steps, 3D contour lines 70a, 70b, 70c, 70d of the outer surface of the rope or cable are calculated, wherein each 3D contour line 70a, 70b, 70c, 70d is obtained as a regression that best approximates the first plurality of 3D contour points 60' or the second plurality of 3D contour points 61', 62'.

Preferably, therefore, at least two, and preferably four, 3D contour lines of the entire surface of the rope or cable are obtained.

For the photogrammetric back-projection of the points in the three-dimensional space, any of the algorithms of 3D-multi-camera-reconstruction is used, some non-exhaustive examples are Triangulation algorithm or Disparity Map reprojection for 3D algorithm or combinations thereof.

In one embodiment of the method, wherein, for example, four cameras are provided to frame the rope or cable, the respective digital images of the still or moving sample relative to the cameras are obtained. Each digital image is then corrected and cleaned of the effects of optical distortion by reconstructing, with the help of the fi(r) function described previously, the correct position of each point.

In the following description, "homologous points" means each of the points on the digital images captured by the respective digital image capture systems, which represent the same point in the real world in three dimensions. Such homologous points, for example, may be searched for on images by means of known algorithms for searching for homologous points, such as Image correlation-based, Edge-based, Segment-based, Adaptive windows, Coarse-to-fine, Dynamic programming, Markov random fields, graph cuts Multi-baseline, or combinations thereof.

In one embodiment of the method, wherein at least a part of the first 12 and a part of the second series of contour lines 22 delimits respectively a first 13 and a second area of the digital image 23 of the first 10 and of the second digital image 20, obtained for example from steps a1) to c1) described previously, the 3D midpoints 32' representative of the axis 30 of the rope or cable are obtained, preferably according to the following steps:

c2) calculating a first mid-axis 14 and a second mid-axis 24 in each first 12 and second series of contour lines 22, wherein said first 14 and second mid-axis 24 are obtained as a regression that best approximates respectively at least a part of the first plurality of image contour points and at least a part of the second plurality of image contour points, and wherein said first 14 and second mid-axis 24 subdivide respectively the first 13 and the second area of the digital image 23 in a respective first sub-area 13a, 23a and second sub-area 13b, 23b;

d2) searching for a first midpoint 15 and a second midpoint 25 belonging to the first 14 and to the second mid-axis 24 respectively, in such a way that the first midpoint 15 belongs to the same epipolar line as the second midpoint 25 and that the first and second midpoint represent the virtual image of a point 31 belonging to a 3D mid-axis 30 of the rope or cable 2;

e2) back-projecting photogrammetrically the first 15 and the second midpoint 25 in a three-dimensional space 40, in such a way as to obtain a 3D midpoint 32 referring to said three-dimensional space 40;

f2) repeating steps c2) to e2) a plurality of times until the three-dimensional representation of a plurality of 3D midpoints 32' representing the points of the axis 30 of the rope or cable is obtained. Thus, these midpoints are preferably a series of points identified by three Cartesian coordinates and describe the point-to-point course of the axis of part or all of the rope or cable along a preferential direction of such rope or cable.

Preferably, in addition to the aforesaid steps, there is provided the step wherein an interpolated 3D mid-axis 33 is calculated, obtained as regression that best approximates the plurality of 3D midpoints 32'. This regression, for example, is any regression curve and preferably a regression line.

In a further embodiment of the method, the diameter of the rope or cable may be measured according to the following steps:

sampling the interpolated 3D mid-axis (33) in order to obtain a plurality of sampled 3D axial points belonging to said interpolated 3D mid-axis (33);

calculating at least a first 72, a second 74, a third and a fourth 73 contour intersection point as the intersection of a plane perpendicular to the interpolated 3D mid-axis 33 passing through an axis point 34 of said plurality of sampled 3D axial points and the 3D contour lines 70a, 70b, 70c, 70d;

calculating at least one first axis distance 82, one second axis distance 83, one third axis distance 84 and one fourth axis distance 85, respectively, as the distance between the first contour intersection point 72 and the axis point 34, between the second contour intersection point 74 and the axis point 34, between the third contour intersection point 71 and the axis point 34 and between the fourth contour intersection point 73 and the axis point 34;

calculating at least a first diameter 80 and a second diameter 81, respectively as the sum of the first axis distance 82 and the second axis distance 83 and as the sum of the third axis distance 84 and the fourth axis distance 85.

Preferably, the point roundness of the rope or cable is measured as the ratio of at least the first diameter 80 and the second diameter 81.

In a variant of the method, moreover, in the case of sufficiently axial-symmetrical ropes or cables, the diameter of the rope or cable is also calculated as the distance between the first contour point and the second contour point.

Subsequently, it is also possible to calculate statistical variables based on the sample population of the calculated point roundnesses, for example the average roundness, as an average of the point roundnesses or the variance of the point roundnesses.

Additionally, the method of the present invention comprises the step of calculating the waviness of the rope or cable, i.e., a measure of the surface homogeneity of the rope or cable.

For calculating the waviness of the outer surface 3 of the cable or rope, the method comprises the steps of:

w1) calculating at least the first axis distance 82 or a plurality of axis distances, for example, the first 82, the second 83, the third 84 and the fourth axis distance 85;

w2) iterating the calculation of the step w1) for a given length of the rope or cable or for the entire length of the rope or cable;

w3) calculating at least one statistical variable on the basis of the sample population of a plurality of first axis distances 82, acquired in step w2) or of the sample population of a plurality of axis distances (82, 83, 84, 85), for example the sample standard deviation of the first axis distances 82, or a processing of the sample standard deviations of the plurality of axis distances (82, 83, 84, 85), or the average value of the sample standard deviations of the plurality of axis distances (82, 83, 84, 85).

The average value of the sample standard deviations of the plurality of axis distances (82, 83, 84, 85) is a preferred index for the evaluation of the waviness of the outer surface 3.

Figure 7:
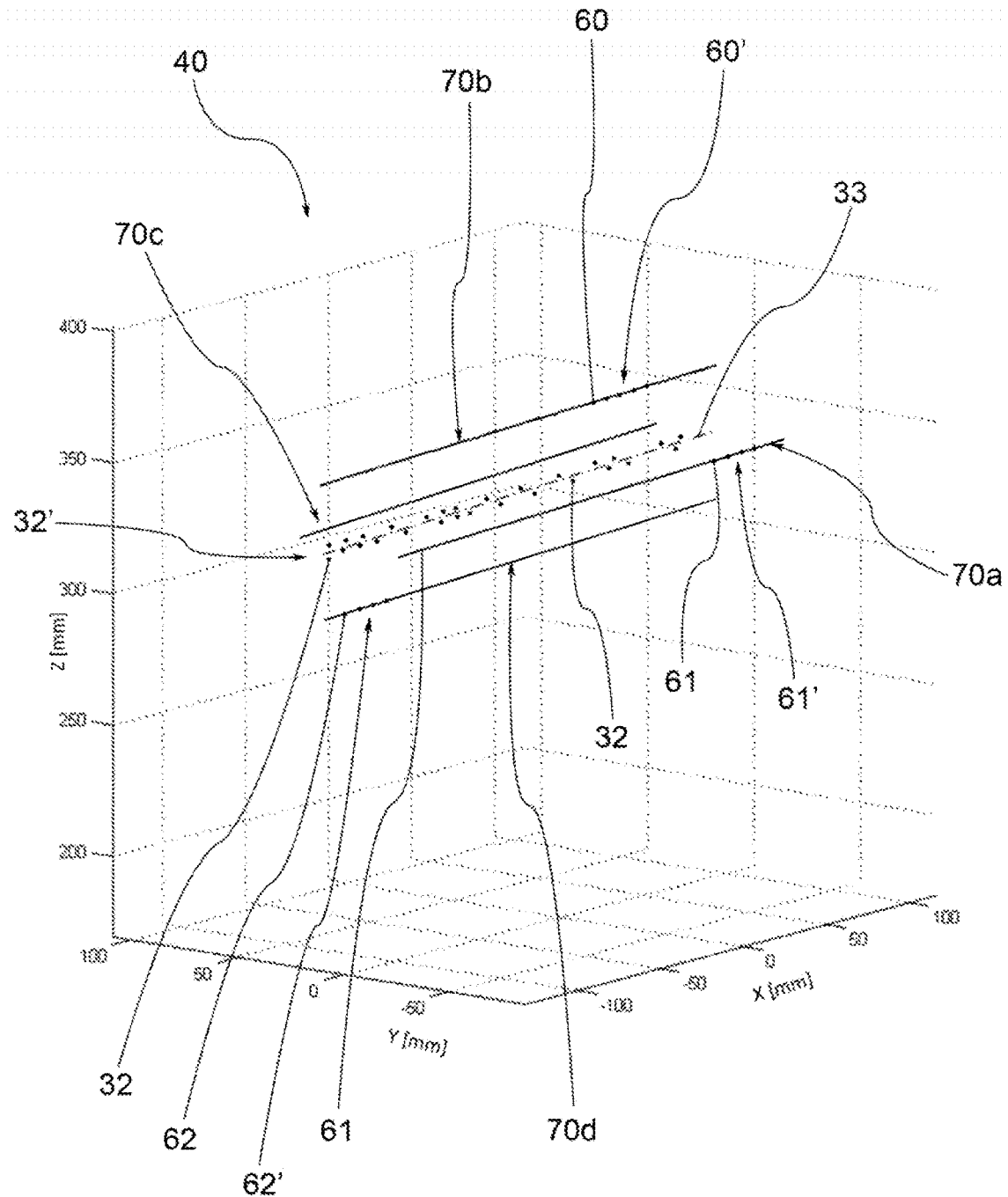
FIG. 7 illustrates a reconstruction of the 3D contour lines, the points of the axis and of the 3D mid-axis interpolated in a three-dimensional space of a rope (or a cable) according to an embodiment of the present invention.
Figure 8:
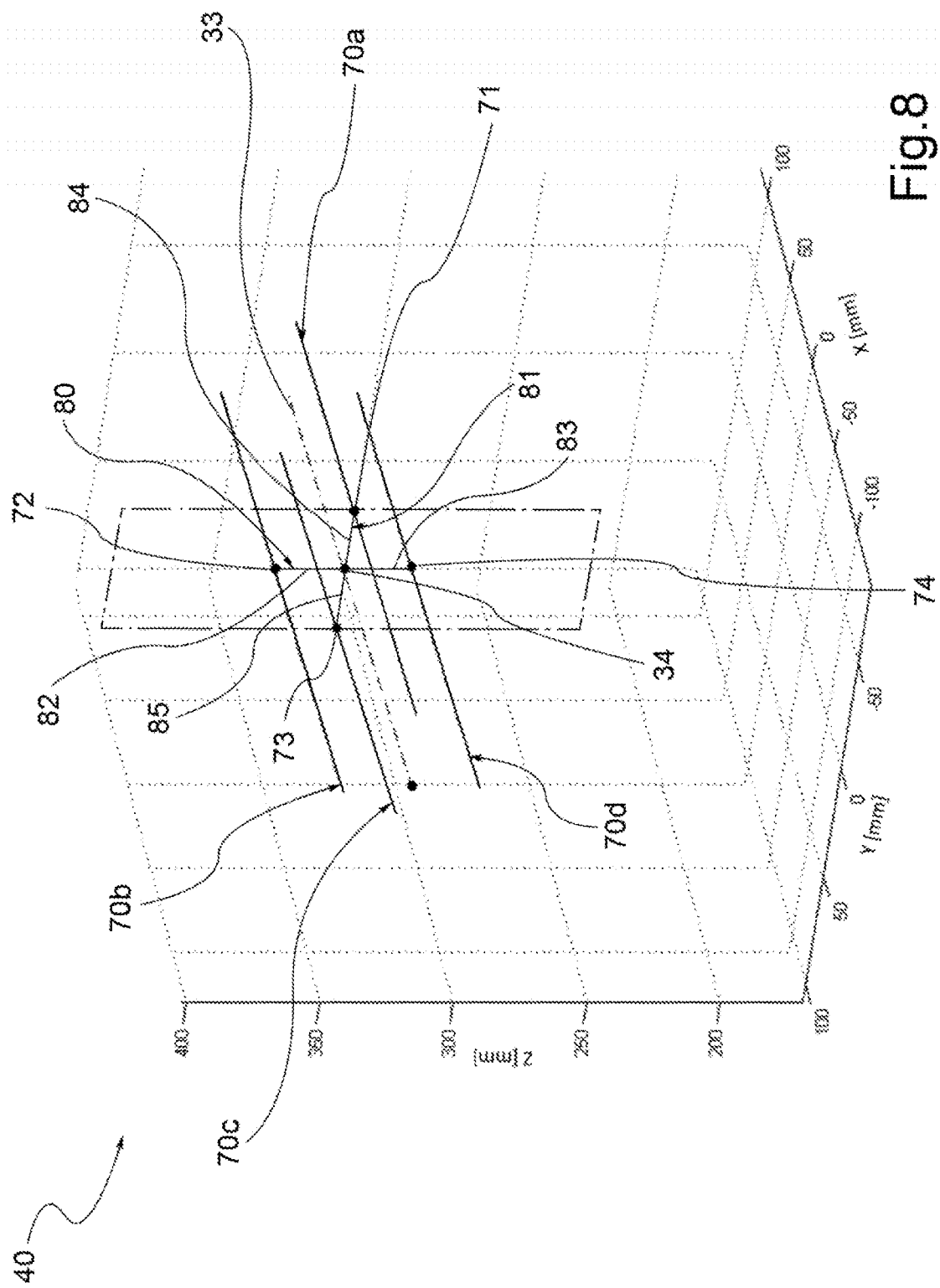
FIG. 8 illustrates a reconstruction of the 3D contour lines, the interpolated 3D mid-axis and the diameters of a rope (or a cable) in a three-dimensional space according to an embodiment of the present invention.
Figure 9:
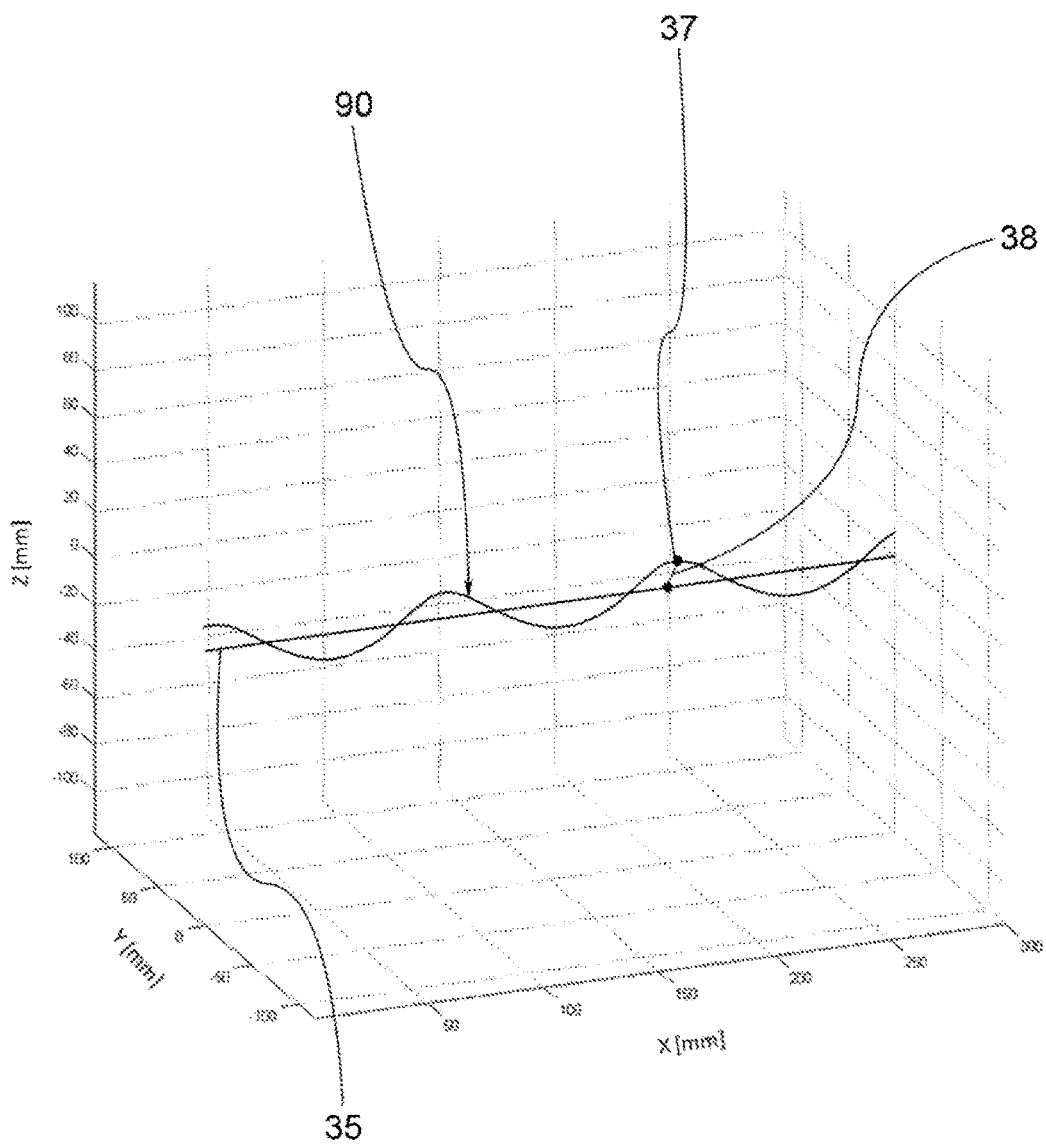
FIG. 9 illustrates a reconstruction of the ideal 3D mid-axis and the real axis obtained by interpolating points with an interpolating curve in a three-dimensional space according to an embodiment of the present invention.
Figure 10:
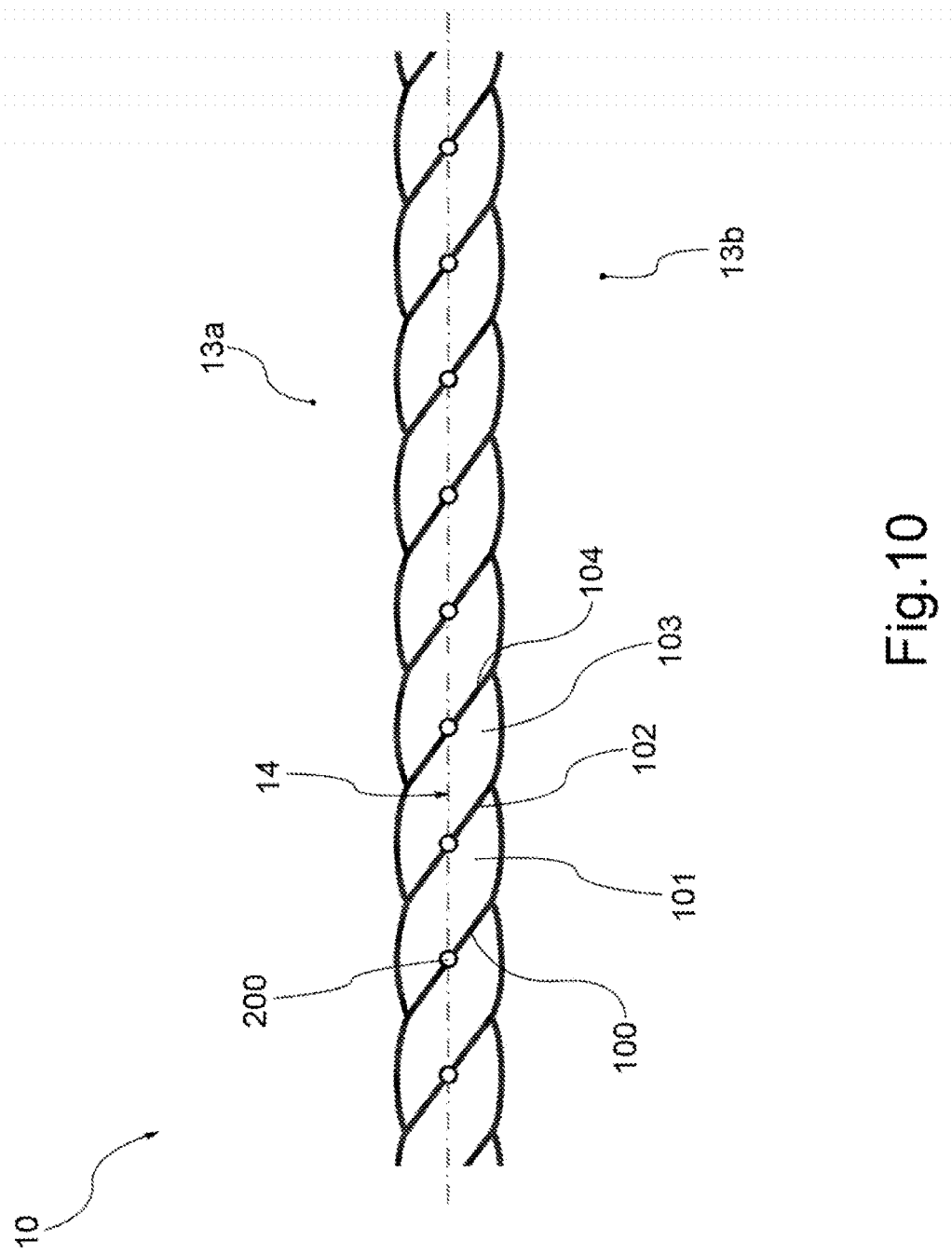
FIG. 10 illustrates a digital image of a rope with a spiral surface captured and processed according to an embodiment of the present invention.
Figure 11:
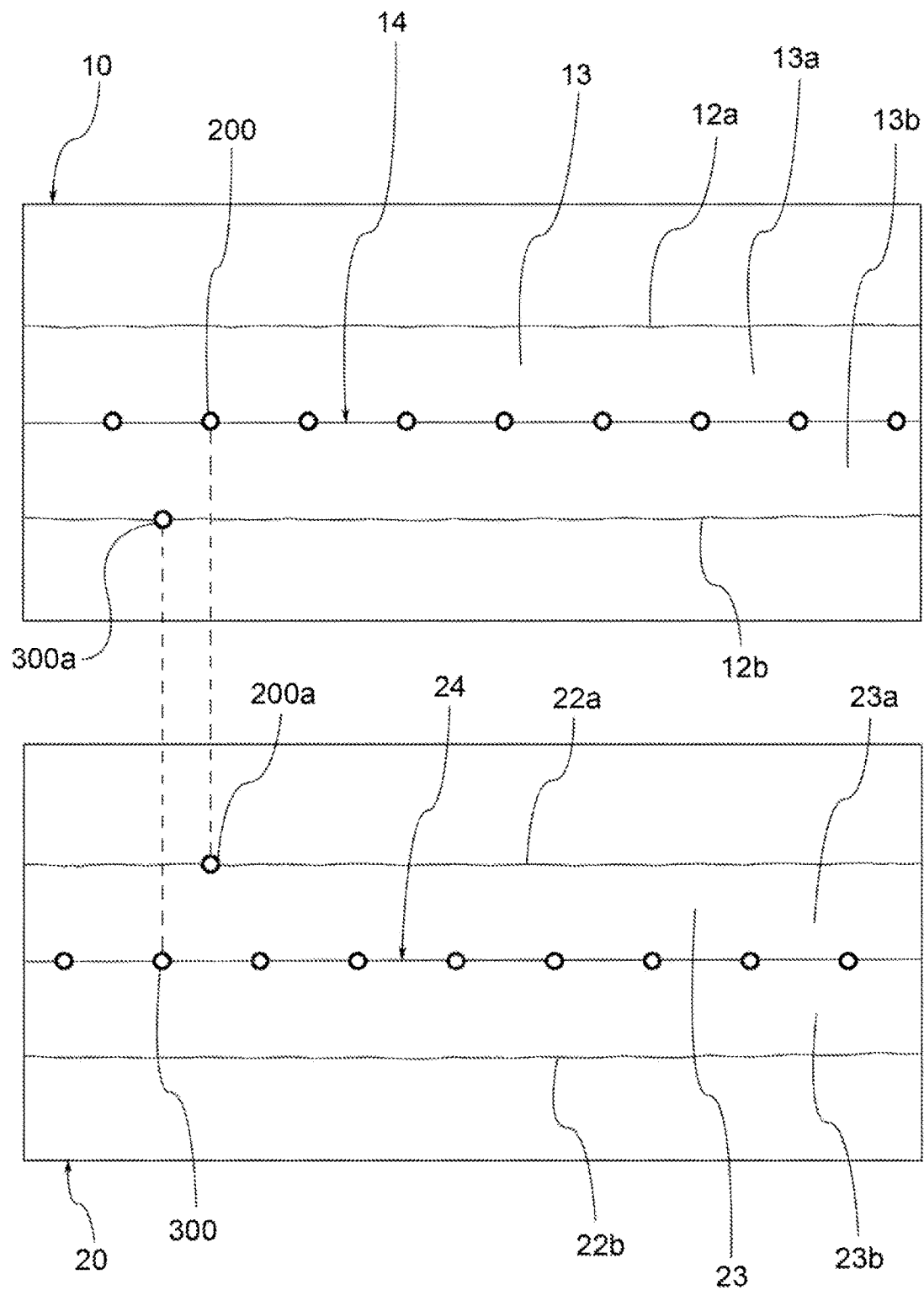
FIG. 11 shows a pair of digital images captured and processed according to a further step of a variant embodiment of the present invention, in the case of a rope (or a cable) with a spiral surface, wherein the intersection points between the contours of the coils and the mid-axis of each image are obtained.
Figure 12:
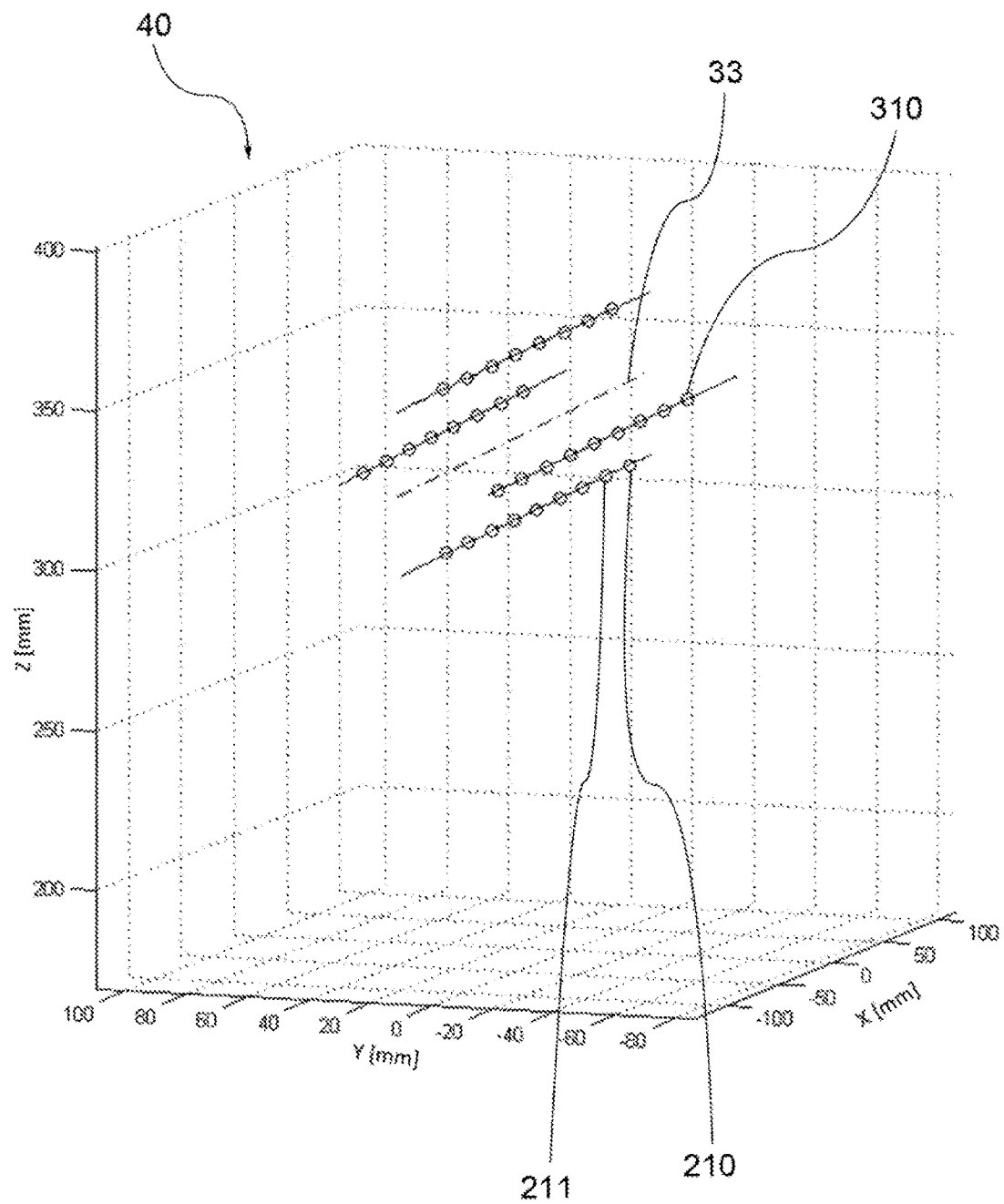
FIG. 12 illustrates a reconstruction of the axis, and points of the helical or spiral surface of a rope (or a cable) to calculate the pitch of the helix or coil in a three-dimensional space according to an embodiment of the present invention.

In one embodiment of the method, for example in the presence of at least one pair of cameras, it is preferable to capture at least one pair of digital images and for each pair of images of the rope or cable to perform the following operations:

a3) by means of the rectification matrices, the points of the images from the respective 2D planes of the camera sensor are transformed into the rectified 2D planes, resulting in a first rectified image and a second rectified image;

b3) in each rectified image, the sample image is isolated from the background, the points identifying the contour lines of the profile of the rope or cable are extracted and the regression line which best approximates the axis of the rectified image is calculated; for example, in the case wherein the contour lines of the profile consist of an upper line 12a, 22a and a lower line 12b, 22b, for example, arranged parallel to a preferential direction of the sensor, the regression line which best approximates the axis of the rectified image of the sample is calculated as the regression line of the points obtained from the average of the coordinates of the points belonging to the upper line 12a, 22a and the lower line 12b, 22b;

c3) for each point on the upper line 12a of the first rectified image, a search is carried out for homologous points in the second rectified image;

d3) for each point on the lower line 22b of the second rectified image, a search is carried out for homologous points in the first rectified image;

e3) for each point on the axis of the first rectified image, a search is carried out for the point on the axis of the second rectified image belonging to the same epipolar line;

f3) in the case wherein each camera of the pair of cameras is positioned diametrically opposite to the axis of the rope or cable, for each point of the upper line 12a' on the first rectified image, a search is carried out for the point of the upper line 22a' or of the lower line 22b' of the second rectified image belonging to the same epipolar line and to the same common area 4 of the region of the outer surface 11, 21 of the rope or cable visible by both cameras, and for each point of the lower line 12b' on the first rectified image a search is carried out for the point of the lower line 22b' or of the upper line 22a' of the second rectified image belonging to the same epipolar line and to the same common area 4 of the region of the outer surface 11, 21 of the rope or cable visible from both cameras, and for each point of the axis of the first rectified image 14' a search is carried out for the point of the axis of the second rectified image 24' belonging to the same epipolar line;

g3) a first set of corresponding point pairs belonging to the contour lines of the rope or cable, a second set of corresponding point pairs belonging to the contour lines of the rope or cable, and a third set of corresponding point pairs belonging to the axes of the rectified images is obtained. Corresponding points thus means homologous points or points belonging to the same epipolar line. Since all the points belonging to the axes of the rectified images also belong to the axes of symmetry of the images of the rope or cable, seen on a plane passing through the focuses of each of the cameras of the pair of cameras, these points belonging to the axes of the images represent the projections of points belonging to the axis of the rope or cable, as shown in FIG. 7.

Preferably, therefore, by means of the projection matrices from the planes rectified to the three-dimensional space, the sets of the pairs of corresponding points belonging to the contour lines of the rope or cable and belonging to the axes of the images rectified in the three-dimensional space are back-projected, obtaining the three-dimensional representation of the referenced points of the contour lines and the axis of the rope or cable, with respect to a three-dimensional space.

In a variant embodiment of the method, there are at least four cameras constituting at least 6 independent pairs of cameras, wherein each pair of cameras detects a respective pair of digital images and wherein at least one of the two images captured by a first pair of cameras is different from at least one of the two images acquired by a second pair of cameras.

In another embodiment of the invention, for example, the linearity of the axis of the rope or cable is measured, preferably by means of a calibrated optical system described previously, performing, in addition to the steps for the reconstruction of the plurality of 3D midpoints 32' representing the points of the axis of the rope or cable, the following additional steps:

interpolating the plurality of 3D midpoints 32' with an interpolating curve 90;

calculating the distance between the interpolated 3D mid-axis 33 and a 3D midpoint 32 belonging to the interpolating curve 90.

In a further embodiment of the method, the interpolating curve is sampled to obtain a plurality of sampled 3D midpoints, and an ideal 3D mid-axis 35 is calculated as a regression line that better approximates said plurality of sampled 3D midpoints, and then the distance 38 between the ideal 3D mid-axis 35 and a sampled 3D midpoint 37 of said plurality of sampled 3D midpoints is calculated.

The interpolating curve, for example, is any geometric curve or, for example, a broken linear curve obtained by 3D interpolation of the 3D midpoints.

Preferably, the distance 38 between the ideal 3D mid-axis 35 and a sampled 3D midpoint 37 of said plurality of sampled 3D midpoints is calculated as the length of the line joining the sampled 3D midpoint 37 and an intersection point between a plane perpendicular to the ideal 3D mid-axis and passing through the sampled 3D midpoint and the ideal 3D mid-axis.

In another embodiment of the method, the pitch of the helix or coils of the rope or cable is also measured, for example, in the case wherein the rope or cable is provided with strands or has a spiral or helical outer surface. Preferably, for example by means of the calibrated optical system 1, in addition to steps a1), b1), c1) and c2) or in addition to steps a1) to g1) and c2) described in the previous paragraphs, with which the first mid-axis 14 and the second mid-axis 24 are calculated, further steps are provided wherein:

a4) lines of separation 100, 102, 104 are defined, on the first 10 and on the second digital image 20 of said first 11 and said second region 21 of the outer surface 3 of the rope or cable, wherein the lines of separation 100, 102, 104 delimit contiguous areas 101, 103 of the first and of the second digital image 20 that follow one another along a direction substantially parallel relative to the first 14 or the second mid-axis 24 and cross said first 14 or second mid-axis 24 from the first sub-area 13a, 23a to the second sub-area 13b, 23b;

b4) an intersection point 200, 300 is identified between the lines of separation 100, 102, 104 and the first 14 and/or the second mid-axis 24;

c4) a homologous intersection point 200a, 300a is searched for in such a way that said homologous intersection point 200a, 300a represents a homologous point of said intersection point 200, 300 and that said intersection point 200, 300 and homologous intersection point 200a, 300a each represent the image of a point common to the first 11 and to the second region 21 of the outer surface 3 of the rope or cable;

d4) back-projecting photogrammetrically the intersection point 200, 300 and the homologous intersection point 200a, 300a in a three-dimensional space 40 so as to obtain a 3D intersection point 210, 310 referring to the three-dimensional space 40;

e4) repeating steps a4) to d4) a plurality of times until the three-dimensional representation of a plurality of 3D intersection points 210, 211, 310 belonging to the first 11 and second region 21 of the outer surface 3 of the rope or cable is obtained;

f4) calculating a distance between at least one first 3D intersection point 210 and at least one second 3D intersection point 211, said second 3D intersection point 211 being relatively adjacent to the first 3D intersection point 210. Preferably, said distance calculated in step f4) described previously is said pitch of the coil or helix of the rope or cable.

Preferably, the distance between the first 3D intersection point 210 and the second 3D intersection point 211 is defined as the pitch of the helix or of the spiral.

To obtain the three-dimensional representation of the plurality of 3D intersection points 210, 211, which allow the pitch of the coils to be calculated, for example, it is also possible to proceed by means of a step wherein are used projection matrices from the planes rectified to the three-dimensional space as already described for the contour lines of the rope or cable, obtaining the three-dimensional representation of the 3D intersection points of the contour lines referred to with respect to a three-dimensional space.

In a further embodiment of the method, there is provided a further step wherein statistical variables (average, variance, percentiles, etc.) are calculated on the population of distances (steps) between the first 3D intersection points 210 and the second 3D intersection points 211, for example, the average step is obtained as an average of the distances between the first 3D intersection points 210 and the second 3D intersection points 211.

Preferably, in an embodiment of the invention, the digital image is a rectified image, according to the known art of image rectification in photogrammetry. For example, the image captured by a camera is rectified by a transformation process generally used to project multiple images onto a common two-dimensional surface, with a standard coordinate system, which modifies the perspective deformations of each image.

Preferably, the method according to the present invention is applied iteratively on portions of the rope or cable 2 at least contiguous at intervals along a direction H-H' parallel to a main dimension of the rope or cable 2. This dimension may also have an indefinite length and this method is therefore applied iteratively along said dimension of indefinite length.

It is clear that, preferably, the method according to the present invention provides for simultaneously capturing at least two or more digital images, each captured by a respective digital image capture device, of a portion of a rope of a predefined length. Therefore, it is not aimed at capturing a single point or a single transverse line of the rope, but rather captures a portion of rope that extends for a predefined length along the axis of the rope.

Preferably, the method described in the previous paragraphs may be loaded directly into the internal memory of a computer in the form of portions of software code suitable for implementing the method as described thus far when the software is run on a computer.

As is evident, innovatively, the calibrated optical system and the measurement method according to the present invention make it possible to reconstruct three-dimensional measurements of ropes or cables or parts of ropes or cables that are stationary or in motion and thus to carry out measurements and quality controls in a non-invasive and non-destructive manner on the rope or cable, with continuity along the entire length of the object, without needing for an operator to carry out manual measurements, for example by means of a gauge for measuring the diameter, without the need to stop the movement of the rope or cable.

Moreover, even more advantageously, the system allows one to obtain the linearity of the axis of the rope or cable, the measurement of the diameter and the roundness of an object that may be approximated to a solid of rotation and the measurement of the pitch of coils present on the surface of the rope or cable, starting from the images of the outer surface of the object itself and for indefinite lengths, simply by making the rope move in a relative way with respect to the optical system. This is useful, for example, for dimensional inspection of long ropes or cables.

In addition, the system is able to perform measurements of geometric parameters automatically even in the presence of difficult environmental conditions and/or those dangerous for the operator, such as measurements in environments contaminated by smoke, gas, dust, chemical fumes, high temperatures (heat, chemical, plasticizing, painting treatments), or measurements of suspended and moving objects (cables, ropes from cranes or overhead traveling cranes), or objects suitable for the movement of materials or people (cables or ropes for mines or cable cars). Moreover, the system allows measurements to be made continuously, without the need to stop the production line and/or the system for transporting materials or people. Finally, the system and method according to the present invention operates independently of the dimensions and material that constitutes the outer and inner surface of the rope or cable.

For example, the 3D optical measurement method and system are also suitable for measuring the geometric parameters of a hollow object.

Moreover, the 3D optical measurement system, being intrinsically calibrated, does not require any further calibration operations before each measurement, as happens in a disadvantageous way for non-calibrated optical measurement systems.

Furthermore, the three-dimensional reconstruction of the plurality of 3D contour points, and, therefore, the three-dimensional measurement of the parameters of the rope, allows the problems of perspective location between the rope and the camera to be overcome, since the contours of the rope will always be reconstructed in a calibrated three-dimensional space, and it is always possible to calculate the parameters independently of the relative position between the camera and the rope during the acquisition of images.

Furthermore, advantageously, the use of synchronized cameras, preferably with a two-dimensional matrix image sensor, allows the acquisition of images of entire portions of the rope at the same time with subsequent photogrammetric reconstruction, reducing or even eliminating measurement errors due to any vibration of the rope, about an axis perpendicular to the axis of the rope.

It is clear that a person skilled in the art, in order to meet specific needs, may make changes to the calibrated optical measurement system or to the method described above, all contained within the scope of protection defined by the following claims.

What is claimed is:

1. A method for three-dimensional measurement of geometric parameters of a rope or a cable having an outer surface, the method comprising the steps of:
   a1) capturing a first digital image of a first region of the outer surface of the rope or cable;
   b1) capturing a second digital image of a second region of the outer surface of the rope or cable, said second region being at least partially distinct from said first region;
   c1) determining a first and a second series of contour lines respectively on said first digital image and said second digital image of said first region and said second region of the outer surface of the rope or cable, wherein said first and second series of contour lines comprise respectively a first plurality of image contour points and a second plurality of image contour points;
   d1) searching for a first contour point and a second contour point belonging respectively to said first plurality of image contour points and said second plurality of image contour points, so that the first contour point and the second contour point are homologous points or points belonging to a same epipolar line, each contour point representing an image of a surface point, said surface point being a point in common with the first region and the second region of the outer surface of the rope or cable;
   e1) back-projecting photogrammetrically the first contour point and the second contour point in a three-dimensional space, so as to obtain a 3D contour point referring to said three-dimensional space;
   f1) repeating steps a1) to e1) a plurality of times until a three-dimensional representation of at least one first plurality of 3D contour points and at least one second plurality of 3D contour points referring to said three-dimensional space is obtained;
   g1) calculating by the at least one first plurality of 3D contour points and/or the at least one second plurality of 3D contour points at least one geometric parameter of the rope or cable selected from: diameter of the rope or cable, roundness of the rope or cable, and axis of the rope or cable;
   wherein at least a part of the first series of contour lines and a part of the second series of contour lines respectively delimit a first area and a second area of digital image of said first and second digital images, said method further comprising the following steps for calculating said axis of the rope or cable:
   c2) calculating a first mid-axis and a second mid-axis in each first and second series of contour lines, wherein said first mid-axis and said second mid-axis are obtained as a regression that best approximates respectively at least a part of the first plurality of image contour points and at least a part of the second plurality of image contour points, and wherein said first mid-axis and said second mid-axis subdivide respectively said first area and said second area of digital image in a respective first sub-area and second sub-area;

d2) searching for a first midpoint and a second midpoint belonging to said first mid-axis and said second mid-axis respectively, in such a way that the first midpoint belongs to the same epipolar line as the second midpoint and that the first and second midpoints represent a virtual image of a point belonging to a 3D mid-axis of the rope or cable;

e2) back-projecting photogrammetrically the first and the second midpoints in the three-dimensional space, in such a way to obtain a 3D midpoint in said three-dimensional space; and f2) repeating steps c2) to e2) a plurality of times until the three-dimensional representation of a plurality of 3D midpoints representing the points of the axis of the rope or cable is obtained.

2. The method of claim 1, further comprising the step of calculating 3D contour lines of the outer surface of the rope or cable, wherein each 3D contour line is obtained as a regression that best approximates the at least one first plurality of 3D contour points or the at least one second plurality of 3D contour points.

3. The method of claim 1, further comprising a step of calculating an interpolated 3D mid-axis, obtained as a regression that best approximates the plurality of 3D midpoints.

4. The method of claim 3, the method comprising:
a3) interpolating the plurality of 3D midpoints with an interpolating curve;
b3) calculating the distance between the interpolated 3D mid-axis and a 3D midpoint belonging to the interpolating curve, the method further comprising the steps of:
c3) sampling the interpolating curve to obtain a plurality of sampled 3D midpoints and calculating an ideal 3D mid-axis as a regression line that best approximates said plurality of sampled 3D midpoints; and
d3) calculating the distance between the ideal 3D mid-axis and a sampled 3D midpoint of said plurality of sampled 3D midpoints.

5. The method of claim 1, the method comprising the step of calculating an interpolated 3D mid-axis, obtained as a regression that best approximates the plurality of 3D midpoints, wherein for calculating the diameter of the rope or cable, the method further comprises:
sampling the interpolated 3D mid-axis to obtain a plurality of sampled 3D axial points belonging to said interpolated 3D mid-axis;
calculating at least one first contour intersection point, one second contour intersection point, one third contour intersection point and one fourth contour intersection point as intersection of a plane perpendicular to the interpolated 3D mid-axis passing through an axis point of said plurality of sampled 3D axial points and the 3D contour lines;
calculating at least one first axis distance, one second axis distance, one third axis distance and one fourth axis distance, respectively, as the distance between the at least one first contour intersection point and the axis point, between the at least one second contour intersection point and the axis point, between the at least one third contour intersection point and the axis point and between the at least one fourth contour intersection point and the axis point; and
calculating at least one first diameter and at least one second diameter, respectively as the sum of the at least one first axis distance and the at least one second axis distance and as the sum of the at least one third axis distance and the at least one fourth axis distance.

6. The method of claim 5, further comprising the step of calculating point roundness of the rope or cable as a ratio between said at least one first diameter and said at least one second diameter.

7. The method of claim 1, the method comprising the step of calculating an interpolated 3D mid-axis, obtained as a regression that best approximates the plurality of 3D midpoints, wherein for calculating waviness of the rope or cable, the method further comprises the steps of:
sampling the interpolated 3D mid-axis to obtain a plurality of sampled 3D axial points belonging to said interpolated 3D mid-axis;
calculating at least one first contour intersection point as the intersection of a plane perpendicular to the interpolated 3D mid-axis passing through an axis point of said plurality of sampled 3D axial points and the 3D contour lines;
w1) calculating at least one first axis distance as the distance between the at least one first contour intersection point and the axis point;
w2) iterating the calculation of step w1) for a given length of the rope or cable or for an entire length of the rope or cable; and
w3) calculating at least one statistical variable on the basis of a sample population of a plurality of first axis distances captured in step w2).

8. The method of claim 7, wherein the calculated statistical variable is a sample standard deviation of the first axis distances.

9. The method of claim 3, wherein, for calculating linearity of the axis of the rope or cable, the method further comprises the steps of:
a3) interpolating the plurality of 3D midpoints with an interpolating curve; and
b3) calculating the distance between the interpolated 3D mid-axis and a 3D midpoint belonging to the interpolating curve.

10. The method of claim 1, wherein said method is applied iteratively on portions of the rope or cable at least contiguous at intervals along a direction parallel to a main dimension of said rope or cable.

11. The method of claim 1, further comprising the step of tensioning the rope or cable in such a way that said rope or cable is similar to a rigid body.

12. A method for three-dimensional measurement of geometric parameters of a rope or a cable having an outer surface, the method comprising the steps of:
a1) capturing a first digital image of a first region of the outer surface of the rope or cable;
b1) capturing a second digital image of a second region of the outer surface of the rope or cable, said second region being at least partially distinct from said first region;
c1) determining a first and a second series of contour lines respectively on said first digital image and said second digital image of said first region and said second region of the outer surface of the rope or cable, wherein said first and second series of contour lines comprise respectively a first plurality of image contour points and a second plurality of image contour points, wherein at least a part of the first series and a part of the second series of contour lines respectively delimit a first area and a second area of digital image of said first digital image and said second digital image, the method further comprising:

c2) calculating a first mid-axis and a second mid-axis in each first and second series of contour lines, wherein said first mid-axis and said second mid-axis are obtained as a regression that best approximates respectively at least a part of the first plurality of image contour points and at least a part of the second plurality of image contour points, and wherein said first mid-axis and said second mid-axis subdivide respectively said first area and said second area of digital image in a respective first sub-area and second sub-area, and the following steps:

a4) defining lines of separation, on said first digital image and said second digital image of said first region and said second region of the outer surface of the rope or cable, wherein said lines of separation delimit contiguous areas of said first digital image and said second digital image that follow one another along a direction substantially parallel with respect to the first mid-axis or the second mid-axis and cross said first mid-axis or second mid-axis from the first sub-area to the second sub-area;

b4) identifying an intersection point between the lines of separation and the first mid-axis and/or the second mid-axis;

c4) searching for a homologous intersection point in such a way that said homologous intersection point represents a homologous point of said intersection point and that said intersection point and homologous intersection point each represent an image of a point common to the first region and second region of the outer surface of the rope or cable;

d4) back-projecting photogrammetrically the intersection point and the homologous intersection point in a three-dimensional space so as to obtain a 3D intersection point referring to the three-dimensional space;

e4) repeating steps a4) to d4) a plurality of times until a three-dimensional representation of a plurality of 3D intersection points belonging to the first region and second region of the outer surface of the rope of cable is obtained; and f4) calculating a distance between at least one first 3D intersection point and at least one second 3D intersection point, said at least one second 3D intersection point being adjacent to the at least one first 3D intersection point.

13. The method of claim 12, wherein said method is applied iteratively on portions of the rope or cable at least contiguous at intervals along a direction parallel to a main dimension of said rope or said cable.

14. A calibrated three-dimensional optical measurement system, for measurement of geometric parameters of a rope or a cable, said calibrated three-dimensional optical measurement system comprising:

a plurality of digital image capture devices suitable for capturing a multiplicity of digital images of at least one region of an external surface of the rope or cable, and a digital image processing device configured to perform the steps of a method for three-dimensional measurement of geometric parameters of a rope or a cable having an outer surface, the method comprising:

a1) capturing a first digital image of a first region of the outer surface of the rope or cable;

b1) capturing a second digital image of a second region of the outer surface of the rope or cable, said second region being at least partially distinct from said first region;

c1) determining a first and a second series of contour lines respectively on said first digital image and said second digital image of said first region and said second region of the outer surface of the rope or cable, wherein said first and second series of contour lines comprise respectively a first plurality of image contour points and a second plurality of image contour points;

d1) searching for a first contour point and a second contour point belonging respectively to said first plurality of image contour points and said second plurality of image contour points, so that the first contour point and the second contour point are homologous points or points belonging to a same epipolar line, each contour point representing an image of a surface point, said surface point being a point in common with the first region and the second region of the outer surface of the rope or cable;

e1) back-projecting photogrammetrically the first contour point and the second contour point in a three-dimensional space, so as to obtain a 3D contour point referring to said three-dimensional space;

f1) repeating steps a1) to e1) a plurality of times until a three-dimensional representation of at least one first plurality of 3D contour points and at least one second plurality of 3D contour points referring to said three-dimensional space is obtained;

g1) calculating by the at least one first plurality of 3D contour points and/or the at least one second plurality of 3D contour points at least one geometric parameter of the rope or cable selected from: diameter of the rope or cable, roundness of the rope or cable, and axis of the rope or cable;

wherein at least a part of the first series of contour lines and a part of the second series of contour lines respectively delimit a first area and a second area of digital image of said first and second digital images, said method further comprising the following steps for calculating said axis of the rope or cable:

c2) calculating a first mid-axis and a second mid-axis in each first and second series of contour lines, wherein said first mid-axis and said second mid-axis are obtained as a regression that best approximates respectively at least a part of the first plurality of image contour points and at least a part of the second plurality of image contour points, and wherein said first mid-axis and said second mid-axis subdivide respectively said first area and said second area of digital image in a respective first sub-area and second sub-area;

d2) searching for a first midpoint and a second midpoint belonging to said first mid-axis and said second mid-axis respectively, in such a way that the first midpoint belongs to the same epipolar line as the second midpoint and that the first and second midpoints represent a virtual image of a point belonging to a 3D mid-axis of the rope or cable;

e2) back-projecting photogrammetrically the first and the second midpoints in the three-dimensional space, in such a way to obtain a 3D midpoint in said three-dimensional space; and f2) repeating steps c2) to e2) a plurality of times until the three-dimensional representation of a plurality of 3D midpoints representing the points of the axis of the rope or cable is obtained;

or of a method for three-dimensional measurement of geometric parameters of a rope or a cable having an outer surface, the method comprising:
- a1) capturing a first digital image of a first region of the outer surface of the rope or cable;
- b1) capturing a second digital image of a second region of the outer surface of the rope or cable, said second region being at least partially distinct from said first region;
- c1) determining a first and a second series of contour lines respectively on said first digital image and said second digital image of said first region and said second region of the outer surface of the rope or cable, wherein said first and second series of contour lines comprise respectively a first plurality of image contour points and a second plurality of image contour points, wherein at least a part of the first series and a part of the second series of contour lines respectively delimit a first area and a second area of digital image of said first digital image and said second digital image, the method further comprising:
- c2) calculating a first mid-axis and a second mid-axis in each first and second series of contour lines, wherein said first mid-axis and said second mid-axis are obtained as a regression that best approximates respectively at least a part of the first plurality of image contour points and at least a part of the second plurality of image contour points, and wherein said first mid-axis and said second mid-axis subdivide respectively said first area and said second area of digital image in a respective first sub-area and second sub-area, and the following steps:
- a4) defining lines of separation, on said first digital image and said second digital image of said first region and said second region of the outer surface of the rope or cable, wherein said lines of separation delimit contiguous areas of said first digital image and said second digital image that follow one another along a direction substantially parallel with respect to the first mid-axis or the second mid-axis and cross said first mid-axis or second mid-axis from the first sub-area to the second sub-area;
- b4) identifying an intersection point between the lines of separation and the first mid-axis and/or the second mid-axis;
- c4) searching for a homologous intersection point in such a way that said homologous intersection point represents a homologous point of said intersection point and that said intersection point and homologous intersection point each represent an image of a point common to the first region and second region of the outer surface of the rope or cable;
- d4) back-projecting photogrammetrically the intersection point and the homologous intersection point in a three-dimensional space so as to obtain a 3D intersection point referring to the three-dimensional space;
- e4) repeating steps a4) to d4) a plurality of times until a three-dimensional representation of a plurality of 3D intersection points belonging to the first region and second region of the outer surface of the rope of cable is obtained; and
- f4) calculating a distance between at least one first 3D intersection point and at least one second 3D intersection point, said at least one second 3D intersection point being adjacent to the at least one first 3D intersection point.

15. The calibrated three-dimensional optical measurement system of claim 14, wherein digital image capture devices of said plurality of digital image capture devices comprise optics, optical focuses of the optics lying on a 90° phase-shifted circumference, each optic facing the center of the circumference, and wherein said digital image capture devices are oriented in such a way that horizontal axes of each optical sensor are perpendicular to a plane containing the circumference, and said horizontal axes are all oriented in a same direction.

16. The calibrated three-dimensional optical measurement system of claim 14, the calibrated three-dimensional optical measurement system being configured for measuring at least one of the following geometric parameters:
  position, orientation and linearity of an axis of the rope or cable or of a solid of rotation that approximates or circumscribes the rope or cable; and
  length of the rope or cable measured along the axis of the rope or cable or of the solid of rotation that approximates or circumscribes the rope or cable.

17. The calibrated three-dimensional optical measurement system of claim 14, wherein the rope or cable comprises coils on an outer spiral surface and wherein said calibrated three-dimensional optical measurement system is configured to measure a pitch between said coils.

18. A computer program product stored in a non-transitory computer readable medium, the computer program product comprising code instructions that, when said code instructions are executed by the calibrated three-dimensional optical measurement system of claim 14, cause the calibrated three-dimensional optical measurement system to carry out the method for three-dimensional measurement of the rope or cable having the outer surface.

* * * * *